(12) United States Patent
Zhuge et al.

(10) Patent No.: US 12,155,167 B2
(45) Date of Patent: Nov. 26, 2024

(54) ELECTRIFIED VEHICLE CONNECTOR ASSEMBLY WITH INTEGRATED NOISE SUPPRESSION

(71) Applicant: FORD GLOBAL TECHNOLOGIES, LLC, Dearborn, MI (US)

(72) Inventors: Kun Zhuge, Nanjing (CN); Yigang Yuan, Nanjing (CN); Chuan Deng, Nanjing (CN); Guohua Du, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 17/829,577

(22) Filed: Jun. 1, 2022

(65) Prior Publication Data

US 2022/0407248 A1    Dec. 22, 2022

(30) Foreign Application Priority Data

Jun. 16, 2021  (CN) .......................... 202110667842.2

(51) Int. Cl.
| | |
|---|---|
| *H01R 9/24* | (2006.01) |
| *B60L 50/64* | (2019.01) |
| *H01F 17/06* | (2006.01) |
| *H01R 13/516* | (2006.01) |
| *H01R 13/52* | (2006.01) |
| *H01R 13/66* | (2006.01) |

(52) U.S. Cl.
CPC ............ *H01R 9/2458* (2013.01); *B60L 50/64* (2019.02); *H01R 13/516* (2013.01); *H01R 13/5202* (2013.01); *H01R 13/6625* (2013.01); *H01F 2017/065* (2013.01); *H01R 2201/26* (2013.01)

(58) Field of Classification Search
CPC ................ H01R 9/2458; H01R 13/516; H01R 13/5202; H01R 13/6625; H01R 2201/26; H01R 13/719; B60L 50/64; H01F 2017/065
See application file for complete search history.

(56) References Cited

U.S. PATENT DOCUMENTS

| | | | |
|---|---|---|---|
| 7,597,560 B2 | 10/2009 | Korich et al. | |
| 9,276,546 B2 | 3/2016 | Craig | |
| 10,660,196 B2 * | 5/2020 | Amaducci | ............ H05K 1/0216 |

* cited by examiner

*Primary Examiner* — Briggitte R. Hammond
(74) *Attorney, Agent, or Firm* — Brooks Kushman PC; David B. Kelley

(57) ABSTRACT

An electrical connector for a vehicle provides integrated noise suppression and includes a housing having openings at both ends, conductors extending through the openings, a magnetic ring surrounding but spaced from the conductors, capacitors spaced from the magnetic ring and coupled to the conductors, and insulating filler disposed within the housing and contacting the magnetic ring and the capacitors.

20 Claims, 6 Drawing Sheets

ELECTRIFIED VEHICLE CONNECTOR ASSEMBLY WITH INTEGRATED NOISE SUPPRESSION

CROSS-REFERENCE TO RELATED APPLICATIONS

This application claims foreign priority benefits under 35 U.S.C. § 119(a)-(d) to CN Application 2021 106 678 422 filed Jun. 16, 2021, which is hereby incorporated by reference in its entirety.

TECHNICAL FIELD

The present disclosure relates to electrified vehicle electrical connectors.

BACKGROUND

Electric vehicles are rapidly evolving in the design and manufacture of modern vehicles. Electric vehicles, such as battery electric vehicles (BEVs), plug-in electric vehicles (PHEVs), and hybrid electric vehicles (HEVs), contain electric motors for driving wheels. Power sources of the electric vehicles are usually high-voltage battery packs, which are connected to vehicle buses through high-voltage connectors for powering the electric motors that drive the vehicle as well as other components. There are a number of designs that provide high-voltage connectors or integrated connection interfaces.

For example, U.S. Pat. No. 7,597,560 discloses a connection interface, which integrates a connector and a plurality of busbars into a housing. In another example, U.S. Pat. No. 9,276,546 discloses a connector assembly in which a main board is provided in a housing, and inductive elements and capacitors are provided in the housing and are precisely positioned to mitigate electromagnetic interference.

SUMMARY

One or more embodiments of the present disclosure provide a connector assembly with a compact structure, reduced electromagnetic noise, and strong applicability, which is believed to solve one or more problems in the prior art.

According to one aspect of the present application, a connector for a vehicle is provided, comprising: a housing having openings at both ends; conductor elements extending through the openings; a magnetic ring surrounding but spaced from the conductor elements; capacitors spaced from the magnetic ring and coupled to the conductor elements; and insulating filler disposed in the housing, wherein the insulating filler contacts the magnetic ring and the capacitors. The capacitors may have a first end in contact with the conductor elements and a second end in contact with the housing. The insulating filler may be a resin material, such as an epoxy resin, a polyphenylene sulfide resin, or a polyimide resin. The magnetic ring may be supported on an insulating skeleton located within the housing so as to be spaced from the housing, and the insulating filler may contact the insulating skeleton. One side of the conductor elements extending out of the housing may form a first group of connection terminals for connection to a high voltage bus, and the other side may form a second group of connection terminals for connection to a battery pack.

In one or more embodiments the conductor elements comprise a positive conductor element and a negative conductor element and the capacitors comprise a first capacitor and a second capacitor, wherein the first capacitor is in contact with the positive conductor element and the housing, and the second capacitor is in contact with the negative conductor element and the housing.

Embodiments may include a housing having a circumferential wall and a bottom wall connected to the circumferential wall, the circumferential wall having a flange portion extending therefrom that contacts a component to be connected, and the housing generally covering a middle portion of the conductor elements, the magnetic ring, and the capacitors. The flange portion of the housing may contact the component to be connected in whole. The flange portion may include a groove, and the connector may further include a sealing ring located within the groove. The capacitors may have a first end connected to the conductor elements by a first fastener and a second end connected to the housing by a second fastener, wherein the insulating filler covers the magnetic ring, and at least a portion of the first fastener and the second fastener. The insulating filler may receive free ends of the first fastener and the second fastener. In yet another embodiment, the insulating fillers covers each of the magnetic ring and the capacitors. The conductor elements may comprise a positive conductor element and a negative conductor element, wherein a first lug for connecting a first capacitor extends on the positive conductor element in a first direction, and wherein a second lug for connecting a second capacitor extends on the negative conductor element in a second direction opposite to the first direction. The housing may be formed of an electrically conductive material.

According to another aspect of the present application, a method for forming a connector is provided, comprising: providing a housing having a circumferential wall and openings at both ends and conductor elements passing through the openings at both ends, providing an insulating skeleton within the housing and providing a magnetic ring on the insulating skeleton; providing capacitors coupled to the conductor elements and spaced from the magnetic ring; and disposing insulating filler to cover the magnetic ring and at least a portion of the capacitors. The method may further comprise curing the insulating fillers to secure the magnetic ring and at least a portion of the capacitors to the housing. The insulating filler may be disposed so that the insulating skeleton is at least partially melted and integrally formed with the insulating filler to secure the magnetic ring in a predetermined position so as to space the magnetic ring from both battery pack housing and the conductor elements. The capacitors may include a first capacitor and a second capacitor, each of the first capacitor and the second capacitor being connected to the conductor elements and the housing, respectively.

In one or more embodiments, a vehicle comprising an electrical connector as described herein is provided, wherein the connector is configured to connect between a battery pack and an electrical device of the vehicle.

The above and other advantages and features of the present application will become apparent from the following detailed description, read alone or in conjunction with the accompanying drawings.

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Features of one or more embodiments may be combined with features of other embodiments to form additional embodiments that are not explicitly described or illustrated. Further in the figures, like referenced numerals refer to like parts throughout the different figures.

DETAILED DESCRIPTION

Figure 1A:
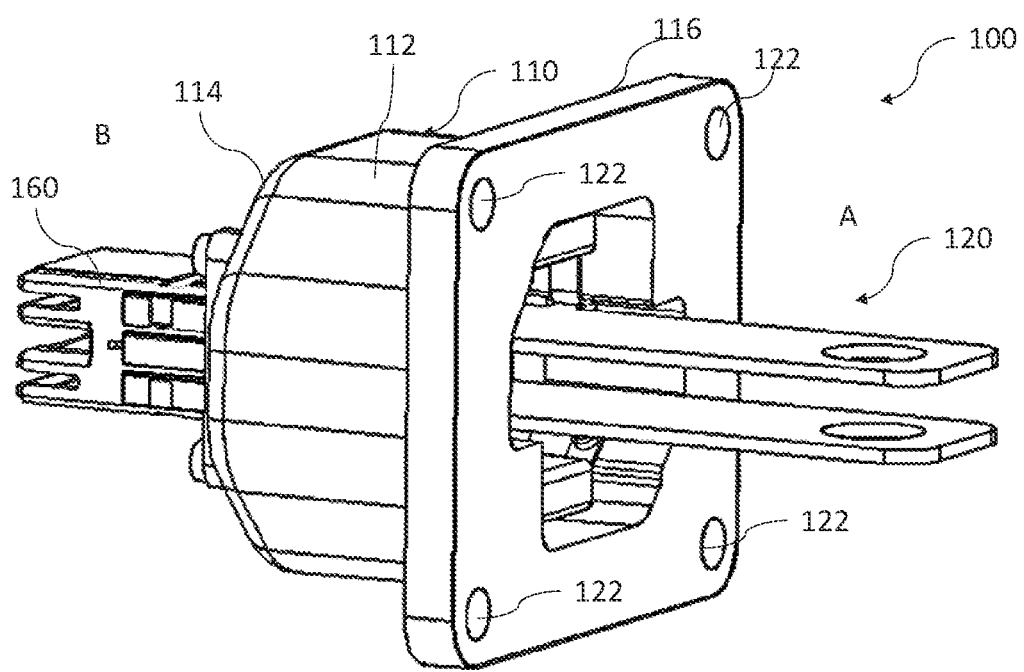
FIG. 1A shows a schematic perspective view of an electrical connector having integrated noise suppression.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In this document, relational terms, such as first and second, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed.

One or more embodiments of the present application will be described below with reference to the accompanying drawings. The flowchart is used to illustrate an example of a process or method. It should be understood that the execution of the flowchart does not need to be performed in sequence, and one or more steps may be omitted, or one or more executed steps may be added, and one or more steps may be performed sequentially or in reverse order, and even in some embodiments concurrently and/or repeatedly whether or not illustrated as such.

As mentioned in the background, with the popularity of electric vehicles, there is a need for a more efficient, stable, and low-noise way to connect battery packs to vehicle buses for electric drive and powering other vehicle accessories or devices. There are a number of designs that provide high-voltage connectors or integrated connection interfaces. The inventors of the present application have realized that the design of the connector assembly may provide better electromagnetic compatibility (EMC) performance and reduce electromagnetic noise from associated components.

Figure 1B:
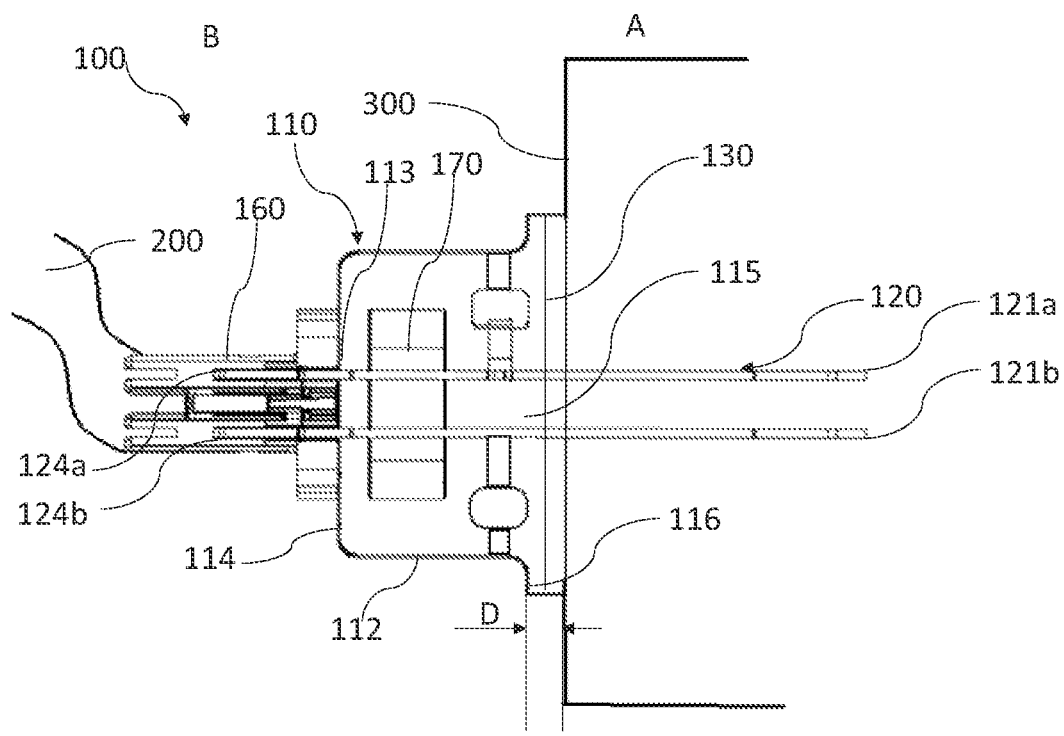
FIG. 1B shows a schematic cross-sectional view of an electrical connector according to one or more embodiments.

As shown in FIGS. 1A and 1B, in one or more embodiments, a connector assembly 100 for electrical connection is provided. The connector assembly 100 can be used in a variety of situations where it is necessary to provide electrical connection between power and an electrical bus and/or device. In one non-limiting embodiment of the present application, the connector assembly 100 is provided for an electric vehicle or a hybrid vehicle, for example, the connector assembly 100 may form a connection between a battery pack and a power bus 200 of electrical devices of the vehicle. In one embodiment, the connector assembly 100 may be fabricated and used as a separate noise reduction, suppression, or cancellation connector accessory. In another embodiment, the connector assembly 100 may be integrated with the component to be connected on one side, for example, the connector assembly 100 may be integrated with a housing of a battery pack 300 to be connected. In another embodiment, the connector assembly 100 may be integrated with the electrical device on one side. For example, the connector assembly may be integrated with connection terminals 160 of the high-voltage inverter. Those skilled in the art can understand that the application scenarios of the connector assembly 100 can be various, such as but not limited to, vehicles, buses, ships and other vehicles that use electrical energy.

Figure 2:
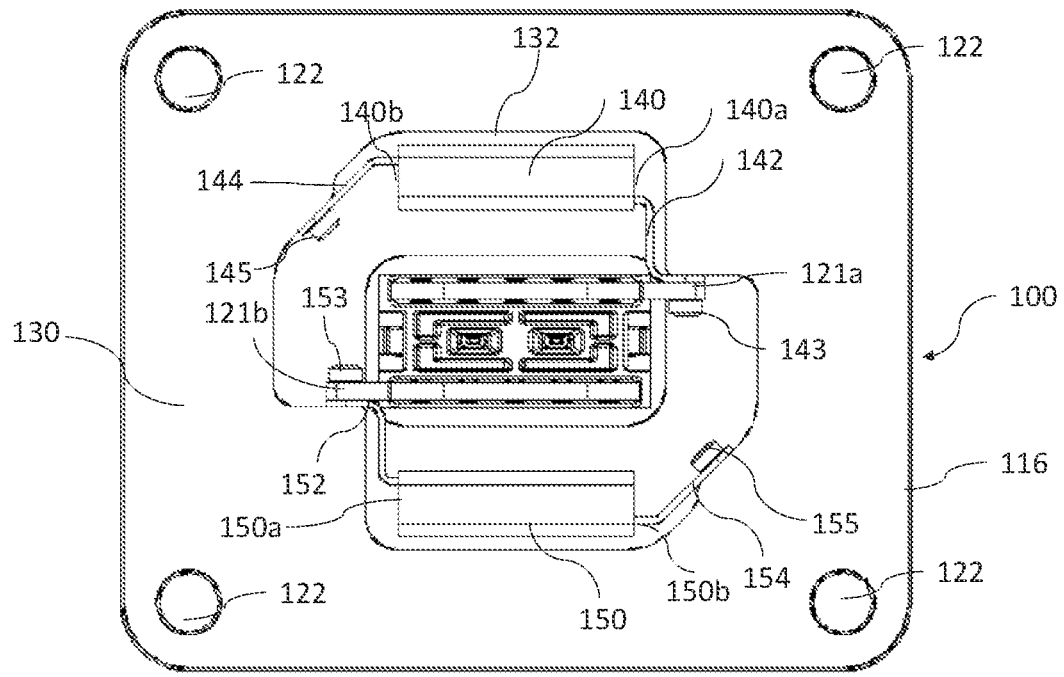
FIG. 2 shows a side view of the illustrated in FIG. 1A viewed from side A.

Referring to FIGS. 1A, 1B, and 2, in the described non-limiting embodiment, the connector assembly 100 includes a housing 110, at least a portion of which is a good conductor in one or more embodiments. In one or more embodiments, the housing 110 may be made of a metallic material, such as aluminum, iron, stainless steel, and the like. As shown in the figure, the housing 110 includes openings at both ends, for example, the openings 113 and 115 in FIG. 1B that allow conductor elements 120 to pass through. The housing 110 has a circumferential wall 112, wherein the circumferential wall 112 may be circumferentially closed. The conductor elements 120 extend through the openings 113 and 115 at both ends of the housing 110, and form first side terminals 121a and 121b for connection to a power source such as the battery pack 300 on one side of the conductor elements 120, and forms a second side terminal 124a and 124b as shown on the other side that connects the output to the electrical device. For example, in the described non-limiting embodiment, the housing 110 has a first side A, which is a power input side, for example, this side may be configured to be in contact with the battery pack 300. The housing 110 has a second side B, which is a power output side, and can be connected to the bus 200 that supplies power to the electrical devices. In addition to the circumferential wall 112, in one embodiment, the housing 110 may also be formed with a bottom wall 114 connected to the circumferential wall 112 on the second side B. A smooth transition may be formed between the bottom wall 114 and the circumferential wall 112. Further, in the direction facing the first side A, the circumferential wall 112 may have an extending flange portion 116 that contacts the component to be connected (e.g., the battery pack 300). The flange portion 116 may extend around the opening 115 and toward the outside of the periphery of the opening 115. In other embodiments, the flange portion 116 may also extend around the opening 115 and at least partially toward the inside of the opening 115, so that the size of the opening 115 on the side A is partially reduced. At the flange portion 116, a connection hole for connection to the battery pack, such as 122 shown in the figure, may be formed. Here or elsewhere, the term "contact" may include substantially conforming contact in its entirety, and may also include contact in at least a portion of the area. For example, the flange portion 116 may have a surface that mates with the surface to be bonded and conforms integrally to the surface to be bonded. In another instance, the flange portion 116 has at least 50% of the area in contact and conformation with the surface to be bonded. In further embodiments, the housing 110 may be filled with an electrically insulating filler 130, and the electrically insulating filler 130 may be cured in a suitable manner to form a shape adapted to the housing 110.

The insulating filler 130 is schematically shown in a transparent manner in order to clearly show the structure. The connector assembly 100 includes a magnetic ring 170 surrounding the conductor elements 120 but spaced from the conductor elements 120; and a first capacitor 140 and a second capacitor 150 spaced from the magnetic ring 170 and coupled to the conductor elements 120 and the housing 110; and the insulating fillers 130 filled in the housing 110 as shown in the figure. Wherein the insulating fillers 130 is shown contacting and covering the magnetic ring 170 as well as contacting the capacitors 140 and 150. Furthermore, in the described embodiment, the flange portion 116 also has a bend toward the component to be connected, such as the battery pack 300, thereby forming an area D. In the described embodiment, the insulating fillers 130 partially fills the area D of the flange portion 116. It can be understood that the insulating fillers 130 may fill more or less, for example, completely fill the area D of the flange portion 116. It can be understood that the area D is not necessarily provided. In the embodiments described below, the flange portion 116 does not have the area D formed by bending, so the flange portion 116 may have a larger area for contacting the components to be bonded. In another embodiment, the insulating fillers 130 may completely or partially close the opening 115. In yet another embodiment, peripheral or central area may also be filled to reduce the size of the opening 115. In one or more embodiments, the curing of the insulating fillers may not be limited by means of temperature control, illumination, time, and the like. Further explanation will be made below with reference to the accompanying drawings.

With further reference to FIG. 2, a side view of the connector assembly 100 of FIG. 1A viewed from side A is shown. Referring to the figure, it can be seen that the conductor elements 120 extends through both ends of the housing 110, presenting on the side A as a bus terminal with a flat cross-section. The connector assembly 100 also includes the first capacitor 140 and the second capacitor 150 connected to the conductor elements 120 as described above. In one or more embodiments, the first capacitor 140 and the second capacitor 150 may be non-polar film capacitors or non-polar ceramic capacitors. Wherein, a first end of the first capacitor 140 may be attached to a first lead 142, and a second end may be attached to a second lead 144, wherein the first lead 142 may be connected to the conductor elements 120, and the second lead 144 is connected to the housing 110 through the insulating fillers 130. In other embodiments, the first capacitor 140 and the second capacitor 150 may have suitable ends, which may be directly welded or otherwise connected to the conductor elements 120 and the housing 110 in a suitable manner. In the described example, the connection of the leads to the capacitors may be accomplished in any suitable manner, such as, but not limited to, soldering. In some embodiments, the leads may be considered part of the capacitor as a whole. In other embodiments, the leads are independent of the capacitors. As will be described below with reference to further figures, the second lead 144 may be connected to the housing 110 by a fastener passing through the insulating fillers 130. In one or more embodiments, the leads (e.g., the first lead 142 and the second lead 144) used to connect the capacitors may be designed to be as short in size as possible to achieve optimized filtering performance. In one or more non-limiting embodiments, during the curing and forming of the insulating fillers 130, holes that allow fasteners to pass through may be provided by pre-embedding sleeves. In another embodiment, prior to placing the insulating fillers 130, sleeves that allows fasteners to pass through may be pre-connected, welded, or connection holes can be reserved in other ways, and then the first capacitor 140 can be electrically connected to the housing 110 by passing fasteners for connection through the sleeves or holes. In yet another embodiment, the fasteners can be directly connected to the insulating fillers 130 without pre-providing connection holes for the fasteners.

As best illustrated in FIG. 2, in one or more embodiments, the first lead 142 of the first capacitor 140 is bent and attached to the conductor elements 120 to form a connection point, where the first lead 142 of the first capacitor 140 is connected to a terminal 121a formed by the conductor elements 120 by means of a fastener 143. In a further embodiment, the fastener 143 is further connected to the insulating fillers 130 to form a more stable fixed connection. For example, in some embodiments, the insulating fillers 130 may be pre-formed with holes for receiving the free end of the fastener 143, or the fastener 143 may also form holes directly on the insulating fillers 130 and bond to the insulating fillers 130 during installation. In the described embodiment, the second lead 144 of the first capacitor 140 can be connected to the insulating fillers 130 through a second fastener 145. As mentioned above, the insulating fillers 130 can also provide a position for the connection of the second fastener 145 by means of a preset connection sleeve or the like, which will be described below in conjunction with further drawings. Similarly, the second capacitor 150 may also similarly include a first end 150a and a second end 150b, wherein the first end 150a is attached to a first lead 152, and the second end 150b is attached to a second lead 154, and wherein the first lead 152 can be connected to a terminal 121b formed by the conductor elements 120 by a fastener 153, and the second lead 154 can be connected to the insulating fillers 130 by a fastener 155, which can pass through the insulating fillers 130 and be electrically connected to the housing 110, thereby similarly fulfilling the function of connecting the capacitor 150 to the housing 110. In the above-described embodiment, the first lead 142 of the first capacitor 140 and the first lead 152 of the second capacitor 150 are all shown as the terminals 121a and 121b formed by connecting the fasteners 143 and 153 to the conductor elements 120, and the fasteners 143 and 153 are also shown secured to the insulating fillers 130 for a more stable securing effect. It can be understood that, in other embodiments, the fastener 143 and the fastener 153 may only connect the conductor elements 120 to the first capacitor 140 and the second capacitor 150 respectively, and the fasteners 143 and 153 are not necessarily required to be connected with the insulating fillers 130.

Continuing to refer to FIGS. 1A, 1B and 2, in the illustrated embodiment, the insulating filler 130 is fitted to the housing 110 and a filler opening 132 is formed in the center to accommodate the conductor elements 120 and the first and second capacitors 140 and 150. The filler opening 132 is configured to follow the orientation of the first capacitor 140, the second capacitor 150 and to mate with the connection of the first capacitor 140, the second capacitor 150 to the conductor elements 120. In some embodiments, an inner wall of the filler opening 132 does not contact a main body of the first capacitor 140 and the second capacitor 150. In other words, in the above-mentioned embodiments, the insulating filler 130 provides support for the leads, such as 142 and 144, of the first capacitor 140 and the leads, such as 152 and 154, of the second capacitor 150 but the insulating filler 130 may remain out of contact with the capacitors 140, 150 themselves. In some embodiments, this connection may provide ease of capacitor installation and replacement.

Figure 3:
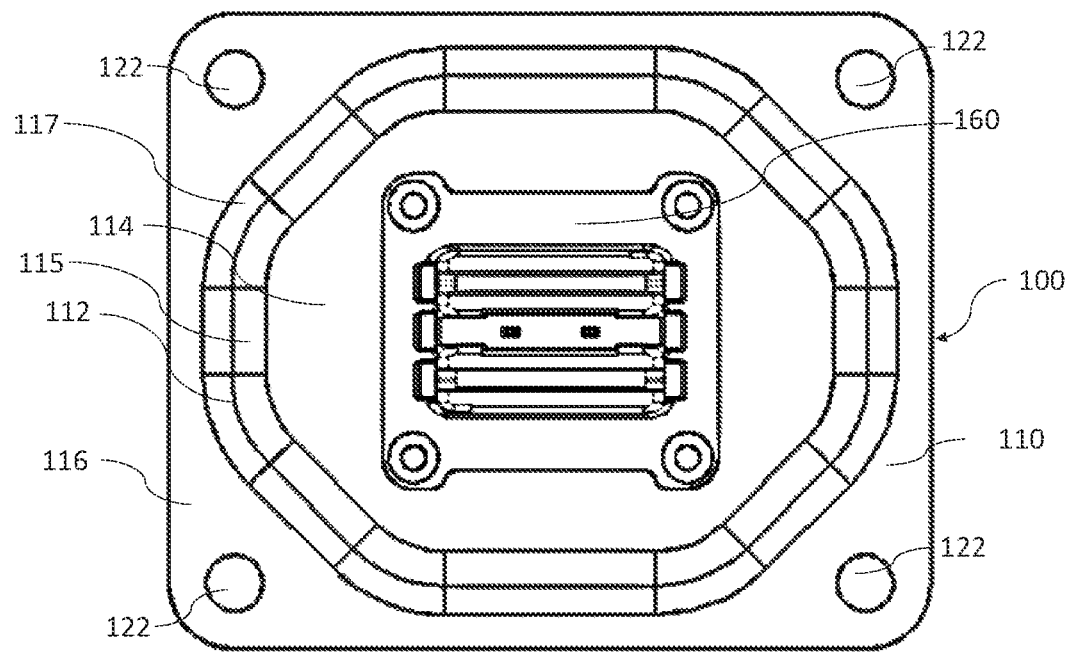
FIG. 3 shows a side view of the connector in FIG. 1A viewed from side B.

Referring to FIG. 3, a side view of the connector assembly 100 of FIG. 1A viewed from side B is shown. As shown in the figure, the housing 110 includes the bottom wall 114, the side wall 112 connected to the bottom wall 114, and the flange portion 116 extending circumferentially from the side wall 112. In the depicted embodiment, an annular smooth transition region 115 may be formed between the bottom wall 114 and the side wall 112, and a smooth transition 117 may also be formed between the flange portion 116 and the side wall 112. On the side shown in FIG. 3, a high-voltage terminal 160 can be integrated, or an electrical connection interface matched with a connector on the side of the vehicle bus can be provided. For example, the connector on the side of the vehicle bus can be connected to the housing 110 by bolts or other suitable means.

Figure 4:
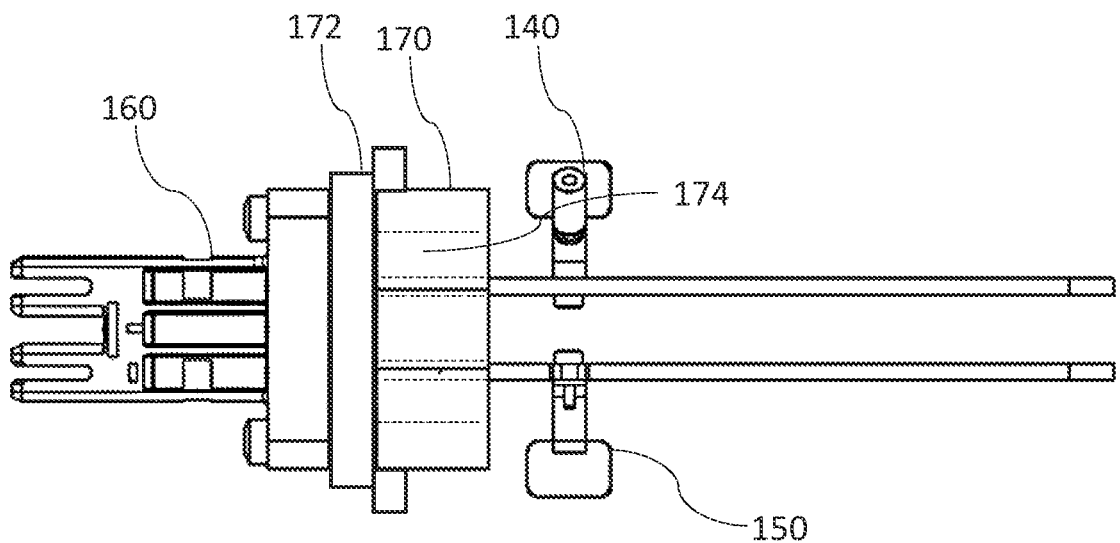
FIG. 4 shows a diagram of internal structure of the electrical connector in the embodiment shown in FIG. 1A wherein the housing and filler are omitted.

FIG. 4 illustrates internal structure of the connector assembly 100 of FIG. 1A with the housing 110 and the internal insulating filler 130 omitted for ease of illustration. In the described non-limiting embodiment, the terminal 160 connected to the bus can be seen on the left in FIG. 4, as described above, the terminals 124a and 124b on the side of the conductor elements 120 may be formed as the terminal 160. Alternatively, the conductor elements 120 may be electrically connected to the connector on this side. In the described embodiment, the magnetic ring 170 does not contact the conductor elements 120 in a radial direction. For example, the illustrated radial clearance of the magnetic ring 170 from the conductor elements 120 is designated 174. In the described embodiment, the first capacitor 140 and the second capacitor 150 are respectively coupled to one of the conductor elements 120, and the first capacitor 140 and the second capacitor 150 are spaced apart from the magnetic ring 170 in an axial direction. In other words, the magnetic ring 170 is not in contact with the first capacitor 140 and the second capacitor 150.

As also shown in FIG. 4, in order to space the magnetic ring 170 from the housing 110 and the conductor elements 120, the magnetic ring 170 may be pre-fixed by a skeleton 172 pre-set within the housing 110. The skeleton 172 may be made of an electrically insulating plastic material, and the plastic skeleton 172 may be sized to fit the inner circumference of the housing 110. In some embodiments, the skeleton 172 may be constructed of the same material as the subsequent insulating filler. During forming, the skeleton 172 is preset in the housing 110, and the magnetic ring 170 can be snapped or otherwise connected to the skeleton 172, so as to realize the space interval between the magnetic ring 170 and the housing 110, and maintain the gap between the magnetic ring 170 and the housing 110. In one or more embodiments, the material of the magnetic ring 170 may be a ferrite material. In such an embodiment, the magnetic ring 170 may be directly sleeved on the outer periphery of the conductor elements 120, or the magnetic ring 170 may be pre-formed into two separate parts that are independent of each other, and then relatively fixed by positioning the skeleton and the insulating filler. In other embodiments, the magnetic ring 170 may be made of nanocrystalline material. In such an embodiment, the integrity of the magnetic ring 170 of nanocrystalline material should be maintained for desired performance. In other words, the magnetic ring 170 cannot be disconnected. During installation, the magnetic ring 170 can be sleeved on the outer circumference of the conductor elements 120 and fixed by the skeleton and the insulating fillers. In conjunction with FIGS. 1A to 3, in the described embodiment, the first ends of the first capacitor 140 and the second capacitor 150 can be in contact with the conductor elements 120 directly or through leads, and the second ends of the first capacitor 140 and the second capacitor 150 can also be in contact with the housing 110 directly or through leads. In one embodiment, the insulating filler 130 is filled in the housing 110, and the insulating filler 130 is in contact with the magnetic ring 170. In a further embodiment, referring to the figures, the insulating filler 130 is in contact with the capacitors 140 and 150. In one embodiment, the housing 110 generally covers a middle portion of the conductor elements 120, the skeleton 172, the magnetic ring 170, the first capacitor 140 and the second capacitor 150 in the axial direction.

Figure 5:
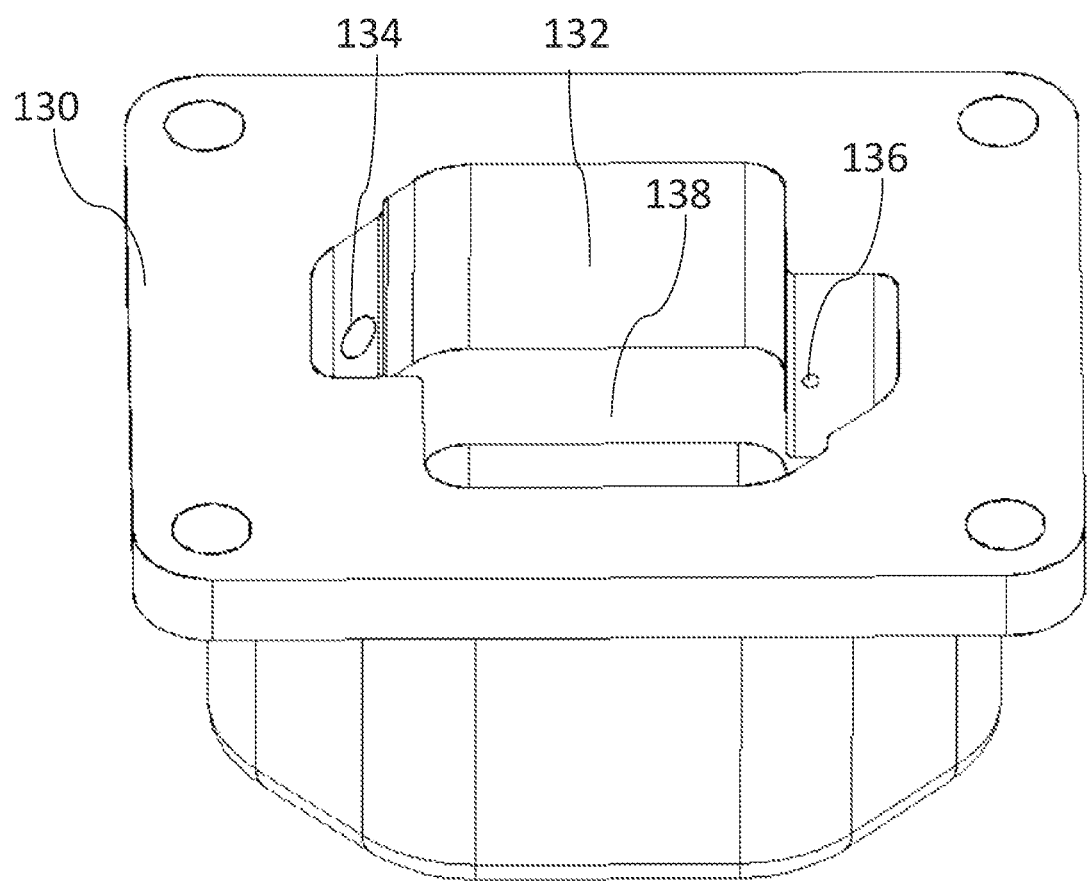
FIG. 5 shows a diagram of filler structure inside the connector shown in FIG. 1A.

Referring next to FIG. 5, a configuration of the insulating filler 130 after curing in one embodiment is shown. In one or more embodiments, the insulating filler 130 may include a resin material. The resin material may be one or more of epoxy resin, polyphenylene sulfide resin, polyimide resin, polyether ether ketone resin, and polysulfone resin. In some embodiments, additives may also be filled. For example, inorganic materials such as mica powder can be filled and glass fiber materials, carbon fiber materials, etc. can also be added to increase structural strength, insulation, and heat resistance. In one or more embodiments, the insulating filler 130 is a thermoset material. In other embodiments, the insulating filler is a thermoplastic material. In various embodiments, the insulating filler 130 can withstand high temperature up to 200 degrees Celsius to 300 degrees Celsius, or even higher. In the embodiment shown in FIG. 5, it can be seen that the filler opening 132 is formed in the insulating filler 130 for the conductor elements 120 to pass through and for mounting the capacitors 140, 150 coupled to conductor elements 120. In the illustrated example, in conjunction with FIG. 2, a hole 136 may receive the free end of the fastener 143 that connects the lead 142 of the capacitor 140 to the conductor elements 120. While a hole 134 may be a connection hole for the fastener 145 that connects the other lead 144 of the capacitor 140 to the housing 110. The hole 134 may include a pre-placed receiving sleeve as described in the above embodiment. The formed magnetic ring 170 may be positioned at an annular gap 138 as shown. In embodiments where two capacitors are provided, the other side of the insulating fillers 130 may have the same arrangement for receiving fasteners.

Figure 6:
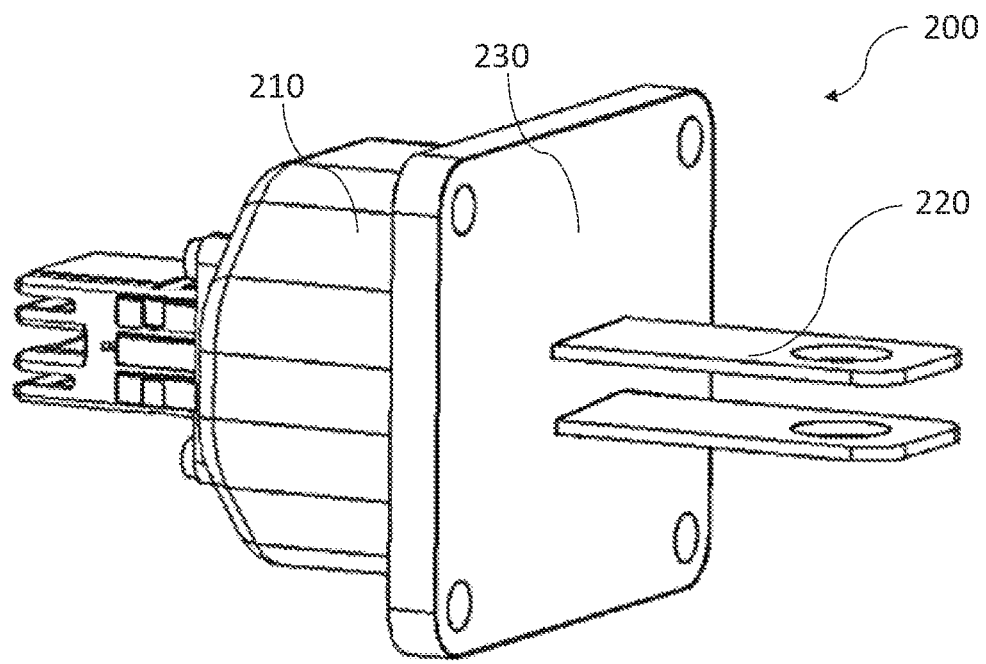
FIG. 6 shows a perspective view of a connector according to one or more embodiments of the present application.

FIG. 6 shows a connector assembly 200 in another embodiment. In this embodiment, the connector assembly 200 may have a similar internal structure to the connector assembly 100 described above. However, different from the structure of the insulating filler described above with reference to FIG. 5, insulating filler 230 in this embodiment can fill the entire interior of a housing 210 and bury the middle portion of conductor elements 220 located in the housing 210, a magnetic ring (not shown) and capacitors (not shown). In this embodiment, the positioning of the magnetic ring can be accomplished by a plastic skeleton similar to that in the above-described embodiments, and the capacitors can be coupled between the conductor elements 220 and a wall of the housing 210 by fasteners or welded connections or the like. Subsequently, the entire interior of the housing 210 may be covered by the insulating filler, and the connector may be completed by curing in a suitable manner. Such a connection method can provide a more stable internal structure of the connector, provide enhanced sealing, and also reduce vibration noise and unevenness during operation, as well as corrosion and other conditions.

Figure 7:
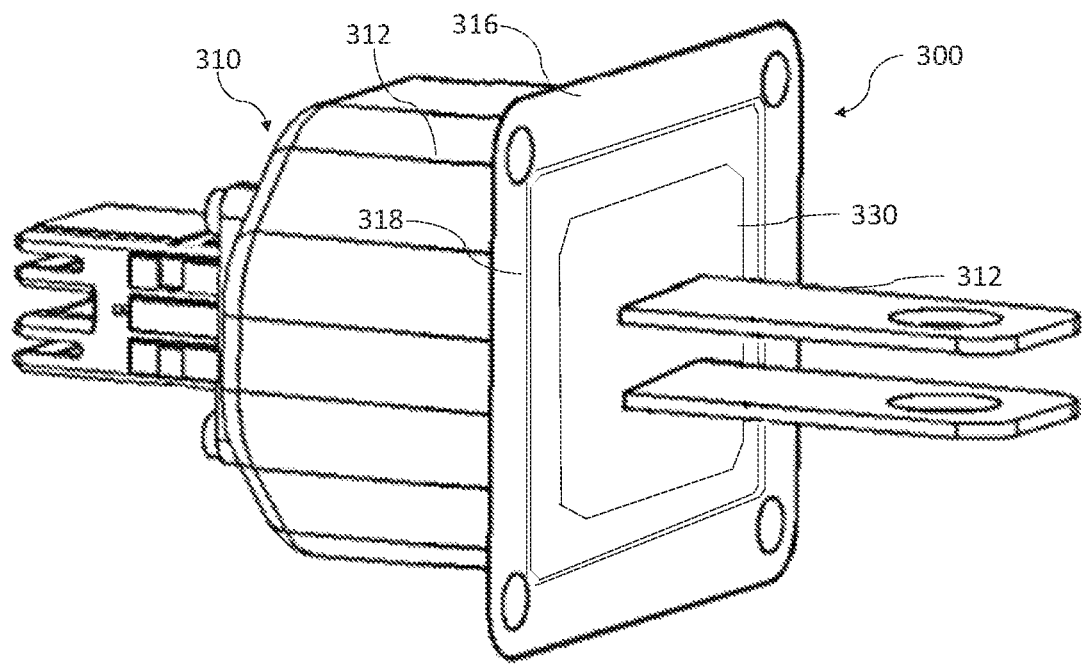
FIG. 7 shows a perspective view of a connector according to one or more embodiments of the present application.

FIG. 7 shows a connector assembly 300 in yet another embodiment. In this embodiment, the connector assembly 300 may have a similar internal structure to the connector assembly 100 described above, but also differs from the connector assemblies 200 and 300 in the structure of the flange portion. As shown, a housing 310 includes a side wall 312, and a flange portion 316 extending circumferentially from the side wall 312. The flange portion 316 is a single-layer structure and does not have a flange and a portion for accommodating insulating filler. Filler 330 can be filled in the housing 310 to be cured and formed, and more or less filler can be filled. The specific setting and curing method thereof are as described above, and will not be repeated here. As shown in FIG. 7, the flange portion 316 surrounds the outer periphery of the filler 330. The flange portion 316 can directly partially or completely fit the components to be connected, so as to achieve a better effect of reducing ground resistance. In one or more embodiments, the flange portion 316 is sized to achieve a ground resistance of less than or equal to 10 milliohms. In one embodiment, a sealing groove 318 is provided on the flange portion 316 around the conductor elements 312 for accommodating a sealing ring, thereby achieving a better sealing effect on the connection side. In the depicted embodiment, a sealing groove 318 is provided on the flange portion 316 to provide a better seal when fitting the components to be connected. The sealing groove 318 surrounds the conductor elements 312 and may have a closed shape. In a further embodiment, the sealing groove 318 is located between the conductor elements 312 and the connection position of the fastener, so that it can be pressed by the fastener to the surface of the component to be connected to achieve a better sealing effect.

Figure 8:
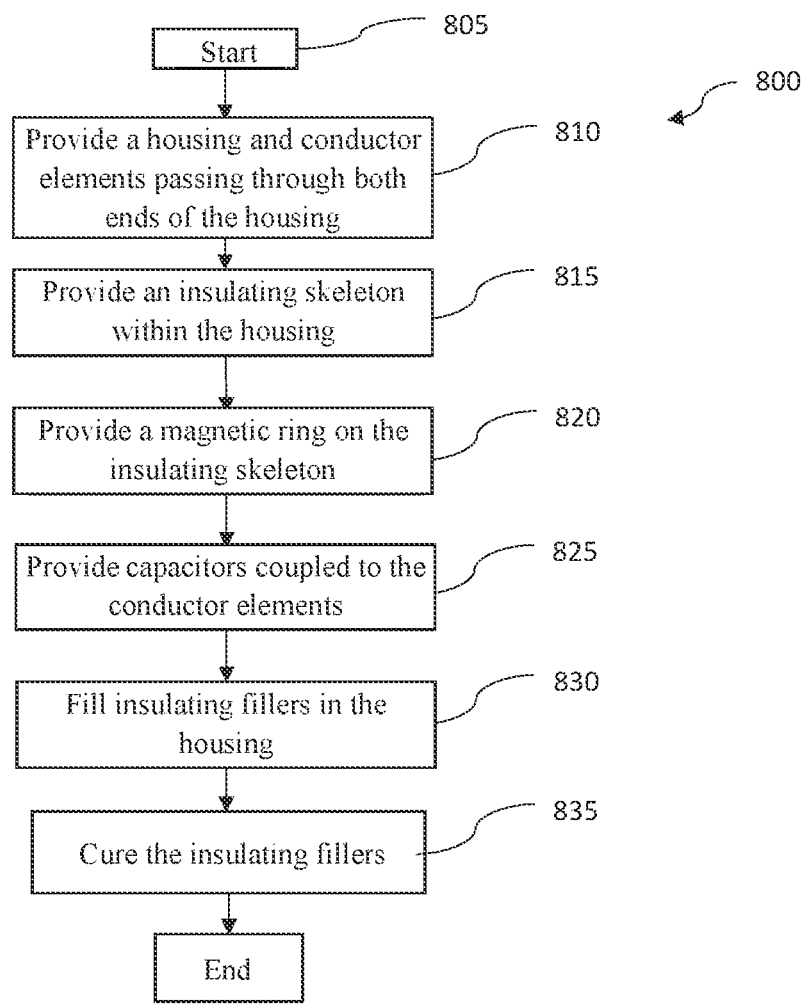
FIG. 8 illustrates a method for forming an electrical connector assembly with integrated noise suppression according to one or more embodiments of the present application.

FIG. 8 generally shows a method for forming a connector assembly in one embodiment. As shown in FIG. 8, the method starts at 805, and next a housing and conductor elements passing through both ends of the housing are provided at step 810. For example, the housing may be 110, 210, 310 in the above embodiments, and the conductor elements may be the conductor elements 120, 220 and 320 in the above embodiments. It should be understood that the steps of providing the housing and the conductor elements can be performed simultaneously, or it is also possible to provide the housing first and then plug the conductor elements, and those skilled in the art can make appropriate choices according to requirements. The method then proceeds to 815, in which an insulating skeleton within the housing is provided. For example, the insulating skeleton may be 172 as described with reference to FIG. 4. It can be understood that the insulating skeleton 172 may have been pre-placed in the housing when the housing is provided, or can be placed in the housing at this step 815, which does not affect the method. The insulating skeleton may be snapped on the inner wall of the housing or bonded to the interior of the housing or fixed to the interior of the housing in other suitable ways. The method then proceeds to the next step 820, in which a magnetic ring is provided on the insulating skeleton, for example, the magnetic ring may be 170 described with reference to FIG. 4. The magnetic ring may be attached to the insulating skeleton by any suitable means, such as, but not limited to, fasteners, adhesives, snaps, and the like. The method then proceeds to 825, in which capacitors coupled to the conductor elements are provided. In the above-described embodiments, capacitors which are respectively attached to the positive and negative conductor elements are provided, each capacitor being coupled to the conductor element at one end and in contact with the housing at the other end. In another embodiment, the capacitor is coupled directly between the conductor elements. Then, the method proceeds to 830, in which insulating filler is supplied to fill the housing. As described in the above embodiment, the insulating filler may include any suitable resin, such as one or more of epoxy resin, polyphenylene sulfide resin, polyimide resin, polyether ether ketone resin, polysulfone resin. For example, inorganic materials such as mica powder can be filled and glass fiber materials, carbon fiber materials, etc. can also be added to improve structural strength, insulation and heat resistance. The method then proceeds to 835, in which the insulating filler is cured. Curing can be achieved by waiting for a certain period of time, or curing via heating or UV light depending on the particular type of filler.

The above embodiments provide a connector assembly with integrated noise suppression that is achieved by providing the magnetic ring surrounding but not in contact with the conductor elements, the capacitors coupled with the conductor elements, and the insulating fillers partially in contact with the magnetic ring and the capacitors. Under the premise of technical feasibility, the technical features listed above for different embodiments may be combined with each other to form additional embodiments within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes", "including", and "include" are inclusive and have the same scope as "comprises", "comprising", and "comprise" respectively.

The above-mentioned embodiments are possible examples of implementations of the present disclosure and are given only for the purpose of enabling those skilled in the art to clearly understand the principles of the claimed subject matter. It should be understood by those skilled in the art that the above discussion to any embodiment is only illustrative, and is not intended to imply that the disclosed scope of the embodiments of the present disclosure (including claims) is limited to these examples. The technical features in the above embodiments or different embodiments can be combined with each other to produce many other changes in different aspects of embodiments of the claimed subject matter that are not provided in detailed description for the sake of brevity. Therefore, any omission, modification, equivalent replacement, improvement, etc. made within the spirit and principle of the claimed subject matter shall be included in the scope of protection defined by the claims.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A vehicle electrical connector, comprising:
   a housing having openings at both ends;
   conductors extending through the openings;
   a magnetic ring surrounding but spaced from the conductors;
   capacitors spaced from the magnetic ring and coupled to the conductors; and
   insulating filler disposed within the housing and contacting the magnetic ring and the capacitors.

2. The vehicle electric connector of claim 1, wherein the capacitors each have a first end in contact with a respective one of the conductors and a second end in contact with the housing.

3. The vehicle electric connector of claim 1, wherein the insulating filler comprises a resin.

4. The vehicle electrical connector of claim 3, wherein the resin comprises at least one of an epoxy resin, a polyphenylene sulfide resin, a polyimide resin, a polyether ether ketone resin, and a polysulfone resin.

5. The vehicle electrical connector of claim 1, wherein the magnetic ring is spaced from the housing and supported on an insulating skeleton located within the housing, and wherein the insulating filler contacts the insulating skeleton.

6. The vehicle electrical connector of claim 1, wherein one side of each of the conductors extending out of the housing forms a first group of connection terminals configured to connect to a vehicle high voltage bus, and the other side of the conductors extending out of the housing forms a second group of connection terminals configured to connect to a vehicle battery pack.

7. The vehicle electrical connector of claim 1, wherein the conductors comprise a positive conductor and a negative conductor, and the capacitors comprise a first capacitor and a second capacitor, wherein the first capacitor has a first terminal electrically coupled to the positive conductor and a second terminal electrically coupled to the housing, and the second capacitor has a first terminal electrically coupled to the negative conductor and a second terminal electrically coupled to the housing.

8. The vehicle electrical connector of claim 1, wherein the housing has a circumferential wall and a bottom wall connected to the circumferential wall, the circumferential wall has a flange portion extending therefrom that contacts a component when connected to the vehicle electrical connector, and the housing covers the magnetic ring, the capacitors, and a middle portion of the conductors.

9. The vehicle electrical connector of claim 8, wherein the flange portion includes a groove, and the vehicle electrical connector further includes a sealing ring located within the groove.

10. The vehicle electrical connector of claim 1, wherein the capacitors have a first end connected to respective ones of the conductors by a first fastener and a second end connected to the housing by a second fastener, wherein the insulating filler covers the magnetic ring, and at least a portion of the first fastener and the second fastener.

11. The vehicle electric connector of claim 10, wherein the insulating filler covers free ends of the first fastener and the second fastener.

12. The vehicle electrical connector of claim 1, wherein the insulating filler covers the magnetic ring and the capacitors.

13. The vehicle electrical connector of claim 1, wherein the conductors comprise a positive conductor and a negative conductor, wherein a first lug for connecting a first capacitor extends on the positive conductor in a first direction, and wherein a second lug for connecting a second capacitor extends on the negative conductor in a second direction opposite to the first direction.

14. The vehicle electrical connector of claim 1, wherein the housing is formed of an electrically conductive material.

15. An electrified vehicle comprising the vehicle electrical connector of claim 1.

16. A method for forming a vehicle electrical connector, comprising:
   providing a housing having a circumferential wall and openings at both ends and conductors passing through the openings;
   providing an insulating skeleton within the housing;
   providing a magnetic ring on the insulating skeleton;
   providing capacitors coupled to the conductors and spaced from the magnetic ring; and
   providing an insulating filler to cover the magnetic ring and at least a portion of the capacitors.

17. The method of claim 16, wherein the method further comprises curing the insulating filler to secure the magnetic ring and at least a portion of the capacitors to the housing.

18. The method of claim 16, wherein the insulating filler is provided so that the insulating skeleton is at least partially melted and integrally formed with the insulating filler, thereby securing the magnetic ring in a predetermined position spaced from both a battery pack housing and the conductors.

19. The method of claim 16, wherein the capacitors comprise a first capacitor and a second capacitor, each of the first capacitor and the second capacitor being connected to the conductors and the housing.

20. An electrified vehicle, comprising:
- a traction battery;
- an electric machine;
- an electric bus electrically coupling the traction battery and the electric machine; and
- an electrical connector connecting the traction battery to the electric bus, wherein the electrical connector comprises:
  - a housing having openings at both ends;
  - conductors extending through the openings;
  - a magnetic ring surrounding but spaced from the conductors;
  - capacitors spaced from the magnetic ring and coupled to the conductors and the housing; and
  - insulating filler disposed within the housing and contacting the magnetic ring and the capacitors.

\* \* \* \* \*